US011220598B2

United States Patent
Cochran

(10) Patent No.: US 11,220,598 B2
(45) Date of Patent: Jan. 11, 2022

(54) BLENDS OF STYRENE-BUTADIENE CO-POLYMERS (SBC) WITH RANDOM BLOCKS AND SMMA

(71) Applicant: INEOS STYROLUTION GROUP GMBH, Frankfurt am Main (DE)

(72) Inventor: Thomas W. Cochran, Channahon, IL (US)

(73) Assignee: INEOS SYTROLUTION GROUP GMBH, Frankfurt am Main (DE)

( * ) Notice: Subject to any disclaimer, the term of this patent is extended or adjusted under 35 U.S.C. 154(b) by 237 days.

(21) Appl. No.: 16/461,974

(22) PCT Filed: Nov. 15, 2017

(86) PCT No.: PCT/EP2017/079291
§ 371 (c)(1),
(2) Date: May 17, 2019

(87) PCT Pub. No.: WO2018/091513
PCT Pub. Date: May 24, 2018

(65) Prior Publication Data
US 2019/0322859 A1    Oct. 24, 2019

(30) Foreign Application Priority Data

Nov. 21, 2016   (EP) .................... 16199778

(51) Int. Cl.
C08L 53/02      (2006.01)
C08F 297/04     (2006.01)
C08G 83/00      (2006.01)
C08L 25/14      (2006.01)

(52) U.S. Cl.
CPC .......... *C08L 53/02* (2013.01); *C08F 297/044* (2013.01); *C08G 83/003* (2013.01); *C08L 25/14* (2013.01); *C08L 2205/06* (2013.01)

(58) Field of Classification Search
CPC ...... C08L 53/02; C08L 25/14; C08L 2205/06; C08F 297/044; C08G 83/003
See application file for complete search history.

(56) References Cited

U.S. PATENT DOCUMENTS

| | | |
|---|---|---|
| 5,290,862 A | 3/1994 | Blasius |
| 6,521,712 B1 | 2/2003 | Knoll et al. |
| 6,593,430 B1 | 7/2003 | Knoll et al. |
| 6,734,247 B2 | 5/2004 | Donn et al. |
| 2003/0004267 A1 | 1/2003 | Swisher et al. |
| 2003/0139519 A1 | 7/2003 | Donn et al. |
| 2016/0168303 A1 | 6/2016 | Niessner et al. |

FOREIGN PATENT DOCUMENTS

| | | | | |
|---|---|---|---|---|
| WO | WO-2015004043 A1 * | 1/2015 | ............ | C08L 25/14 |
| WO | 2015/071207 A1 | 5/2015 | | |

OTHER PUBLICATIONS

International Preliminary Report on Patentability in International Application No. PCT/EP2017/079291 dated Oct. 31, 2018.
Modern Styrenic Polymers: Polystyrenes and Styrenic Copolymers (Eds. J. Scheirs, D. Priddy, Wiley, Chichester, UK, 2003), pp. 502-507.

* cited by examiner

*Primary Examiner* — John E Uselding
(74) *Attorney, Agent, or Firm* — J.A. Lindeman & Co. PLLC; Aaron Raphael

(57) ABSTRACT

Polymer composition comprising (a) 33 to 52 wt.-% star-shaped block copolymers (a) comprising terminal vinylaromatic polymer blocks $S_1$ and $S_2$, and random styrene/butadiene copolymer blocks (B/S); and (b) 48 to 67 wt.-% SMMA copolymers (b). Moldings and shaped articles produced thereof have a high clarity and toughness and can be used in the household, appliance and healthcare sector.

11 Claims, No Drawings

BLENDS OF STYRENE-BUTADIENE CO-POLYMERS (SBC) WITH RANDOM BLOCKS AND SMMA

DESCRIPTION

The invention relates to polymer compositions, based on styrene-butadiene co-polymers (SBC) and styrene-methyl methacrylate (SMMA) copolymers, with improved clarity and toughness, and also to thermoplastic moldings and shaped articles produced therefrom and to their use.

Styrene-butadiene co-polymers are known to provide effective modifiers to gain impact strength in blends with styrene-methyl methacrylate copolymers while still maintaining a good transparency and/or low haze.

U.S. Pat. Nos. 5,290,862 and 6,734,247 describe blends of SMMA copolymers and SBCs with SBCs having a tapered, linear or radial, di-block (vinyl aromatic monomer-conjugated diene) or tri-block (vinyl aromatic monomer-conjugated diene-vinyl aromatic monomer) molecular architecture. The optical properties such as clarity and haze as well as the mechanical properties such as toughness (Notched Izod Impact strength) of the obtained materials are still in need of improvement.

WO 2015/071207 discloses polymer compositions based on a SMMA copolymer component and a polyphenylene ether. The SMMA copolymer component can additionally comprise linear or star-shaped SBCs with external polystyrene blocks and between these, one or more (S/B) blocks having random or tapered styrene/butadiene distribution. Said SBCs are commercially available as Styrolux® 3G 55, Styrolux® 684D and Styrolux® 3G33 (Ineos Styrolution, Germany). The SBC/SMMA-weight ratio is 0.2 to 4, preferably 0.2 to 2.6 and more preferred 0.6 to 1.5. Comparative examples show blends consisting of 45 wt.-% SMMA copolymer (24% or 30 wt.-% MMA) and 55 wt.-% Styrolux® 3G 55.

The afore-mentioned polymer compositions of the prior art require further improvement in respect to clarity, haze and toughness (i.e. high impact resistance). Thus, it is an object of the invention to provide a polymer composition with improved clarity, haze and toughness.

According to the invention, this object is achieved by providing a polymer composition comprising (or consisting of) components (a), (b) and (c):
- (a) 33 to 52 wt.-% of at least one star-shaped block copolymer (a) which comprises at least two terminal polymer blocks $S_1$ and $S_2$ made from vinylaromatic monomers, in particular styrene, and at least one random copolymer block (B/S) made from 20 to 60 wt.-% vinylaromatic monomer, in particular styrene, and from 40 to 80 wt.-% diene, in particular 1,3-butadiene, and where the total block copolymer (a) is made from 50 to 85 wt.-% vinylaromatic monomer, in particular styrene, and from 15 to 50 wt.-% diene, in particular 1,3-butadiene;
- (b) 48 to 67 wt.-% of at least one copolymer (b) made from 65 to 90 wt.-% vinylaromatic monomer (b11), in particular styrene, and 10 to 35 wt.-% methyl methacrylate (b12); and optionally
- (c) 0 to 5 wt.-% of one or more additive(s) and/or processing aid (c), wherein the total amount of components (a), (b) and (c) is 100 wt.-%.

Wt.-% means percent by weight. A "random" copolymer block (B/S) means a copolymer block having a statistical distribution of the polymerized units of the vinylaromatic monomers and dienes. "Star-shaped" (or radial) block copolymers have at least 3 branches branching from a central attachment point.

Preferably the polymer composition according to the invention comprises (or consists of) components (a), (b) and (c) in the following amounts:
- 33 to 50 wt.-% (a),
- 50 to 67 wt.-% (b), and
- 0 to 5 wt.-% (c), often 0.1 to 5 wt.-% (c).

More preferably the polymer composition according to the invention comprises (or consists of) components (a), (b) and (c) in the following amounts:
- 34 to 45 wt.-% (a),
- 55 to 66 wt.-% (b), and
- 0 to 4 wt.-% (c), often 0.1 to 4 wt.-% (c).

In particular preferred is a polymer composition according to the invention comprising or (consisting of):
- 34 to 37 wt.-% (a),
- 63 to 66 wt.-% (b), and
- 0 to 3 wt.-% (c), often 0.1 to 3 wt.-% (c).

The amount of component (c) is preferably from 0 to 4 wt.-%, more preferred from 0 to 3.0 wt.-%, based on the total comprised in the polymer composition according to the invention. If component (c) is present, its minimum amount is usually 0.1 wt.-%.

If component (c) is present, the amount of component (c) comprised in the polymer composition according to the invention is generally from 0.1 to 5% by weight, preferably from 0.1 to 4% by weight, more preferred from 0.1 to 3% by weight.

Preferred are polymer compositions according to the invention wherein at least one additive, in particular at least one anti-oxidant and/or thermal stabilizer, and/or a processing aid or plasticizer such as a mineral oil are present.

One preferred polymer composition comprises (or consists of):
- 33 to 51.9 wt.-% (a),
- 48 to 66.9 wt.-% (b), and
- 0.1 to 5 wt.-% (c).

A further preferred polymer composition comprises (or consists of):
- 33 to 49.9 wt.-% (a),
- 50 to 66.9 wt.-% (b), and
- 0.1 to 5 wt.-% (c).

A further preferred polymer composition comprises (or consists of):
- 34 to 44.9 wt.-% (a),
- 55 to 65.9 wt.-% (b), and
- 0.1 to 4 wt.-% (c).

In particular preferred is a polymer composition comprising (or consisting of): composition comprises (or consists of):
- 34 to 36.9 wt.-% (a),
- 63 to 65.9 wt.-% (b), and
- 0.1 to 3 wt.-% (c).

Preferred are polymer compositions wherein the values of the refractive index of components (a) and (b) differ no more than 0.01, preferably 0.005, more preferably no more than 0.002. This results in a product of particular high clarity and low haze.

Component (a)

Vinyl aromatic monomers which may be used for the polymer blocks S1 and S2 or else for the copolymer blocks B/S are styrene, a-methylstyrene, p-methylstyrene, ethylstyrene, tert-butylstyrene, vinyl toluene or mixtures of these, preferably styrene. The polymer blocks $S_1$ and $S_2$ of the star-shaped block copolymer (a) are hard phases with a glass transition temperature (Tg)>70° C. The polymer blocks S1 and S2 can be made from 95 to 100 wt.-% of at least one vinylaromatic monomer and 0 to 5 wt.-% of at least one diene, preferably the polymer blocks S1 and S2 are homopolymers made from vinylaromatic monomers.

Preferred dienes for the at least one random copolymer block B/S (or optionally for the polymers S1 and S2) are 1,3-butadiene, isoprene, 2,3-dimethylbutadiene, 1,3-pentadiene, 1,3-hexadienes or piperylene or mixtures of these, particularly preferably 1,3-butadiene. The random copolymer block B/S is a soft phase (block) with a Tg <0° C.

Copolymer blocks (B/S) with random distribution can by way of example be obtained by anionic polymerization using alkyllithium compounds in the presence of randomizers, such as tetrahydrofuran, or potassium salts. Preference is given to use of potassium salts where the molar ratio of anionic initiator to potassium salt is in the range from 25:1 to 60:1, particularly preferably from 30:1 to 40:1. This method can at the same time achieve a low proportion of 1,2 linkages of the butadiene units. Suitable potassium salts are K alcoholates, in particular those soluble in the polymerization solvent, e.g. tert-amyl alcoholate or triethylcarbinolate, or other C-rich tertiary alcoholates.

Preferably the random copolymer blocks B/S of the star-shaped block copolymer (a) are made from butadiene and styrene.

Preferably the star-shaped block copolymer (a) is made from:

60 to 80 wt.-% vinylaromatic monomer, in particular styrene, and 20 to 40 wt.-% diene, in particular 1,3-butadiene, wherein the total amount of the vinyl aromatic monomer and the diene is 100 wt.-%.

It is preferable for the block copolymer (a) to be composed exclusively of hard (homo)polymer blocks $S_1$ and $S_2$ and also of at least one random soft block B/S, and not to contain any homopolydiene blocks B. Preferred block copolymers contain external hard (homo)polymer blocks $S_1$ and $S_2$ having different block lengths. The number-average molar mass $M_n$ of $S_1$ is preferably from 5000 to 30000 g/mol, in particular from 10,000 to 20,000 g/mol. The number-average molar mass $M_n$ of $S_2$ is preferably at least 35,000 g/mol. Preferred molar masses $M_n$ of $S_2$ are from 35,000 to 150,000 g/mol, more preferred 50,000 to 150,000 g/mol.

There may also be more than one random copolymer block B/S. Preference is given to at least 2 random soft copolymer blocks $(B/S)_1$ and $(B/S)_2$ having different proportions of vinylaromatic monomers and therefore different glass transition temperatures. For all copolymer blocks B/S such as $(B/S)_1$, $(B/S)_2$ etc., Tg is <0° C., generally in the range between −80° to 0° C., preferably in the range from −70° C. to −20° C., particularly preferably from −70 to −40° C. The Tg is measured by methods known to the SBC-polymer chemist.

The number-average molar mass $M_n$ of the at least one copolymer block (B/S) of the block copolymer (a) is preferably in the range from 2,000 to 20,000 g/mol, particularly preferably from 5,000 to 10,000 g/mol.

Preferably the random copolymer block $(B/S)_1$ is made from 40 to 60 wt.-% vinylaromatic monomer, in particular styrene, and from 40 to 60 wt.-% diene, in particular 1,3-butadiene, and the random copolymer block $(B/S)_2$ is made from 20 to 39 wt.-% vinylaromatic monomer, in particular styrene, and from 61 to 80 wt.-% diene, in particular 1,3-butadiene, wherein the total amount of the vinyl aromatic monomer and the diene is 100 wt.-%.

The star-shaped block copolymers used are preferably those which have a structure in which at least one arm of the star has a block sequence $S_1$-(B/S) and one arm of the star has the block sequence $S_2$-(B/S), or those in which at least one arm of the star has the block sequence $S_1$-(B/S)-$S_3$ and at least one arm of the star has the block sequence $S_2$-(B/S)-$S_3$. $S_3$ here is another polymer hard block as described for polymer blocks S1 and S2 above. $S_3$ generally is a short (homo)polymer hard block whose number-average molar mass $M_n$ is smaller than 2500 g/mol.

Particular preference is given to star-shaped block copolymers (a) having structures in which the star has at least one branch having the block sequence $S_1$-$(B/S)_1$-$(B/S)_2$ and at least one branch having the block sequence $S_2$-$(B/S)_1$-$(B/S)_2$, or in which the star has at least one branch with the block sequence $S_1$-$(B/S)_1$-$(B/S)_2$-$S_3$ and at least one branch with the block sequence $S_2$-$(B/S)_1$-$(B/S)_2$-$S_3$.

In particular preferred are star-shaped (or radial) block copolymers (a) having a dendrimer structure, more preferably a first generation dendrimer structure, in particular a first generation dendrimer structure having four branches.

Most preferred are star-shaped block copolymers (a) of the following structures:

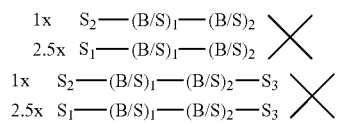

In this case X is a tetrafunctional coupling agent (e.g. epoxidized linseed oil).

The block copolymers (a) are prepared preferably by sequential anionic polymerization. The aforementioned SBCs are known. Their preparation is described for example in "Modern Styrenic Polymers: Polystyrenes and Styrenic Copolymers" (Eds., J. Scheirs, D. Priddy, Wiley, Chichester, UK, (2003), pages 502 to 507) and in particular in U.S. Pat. No. 6,521,712 (col. 2, l. 52 to col. 4, line 2).

The living polymer chains may be linked to give a star shape by polyfunctional (n≥3) capping agents, such as polyfunctional aldehydes, ketones, esters, anhydrides or epoxides. Symmetrical or asymmetrical star block copolymers whose branches may have the abovementioned block structures may be obtained here by coupling identical or different blocks. Asymmetrical star block copolymers are obtainable, for example, by preparing the individual branches of the star separately and/or by initiating more than once, for example initiating twice with the initiator divided in a ratio of from 2/1 to 10/1.

Component (b)

Preferred are copolymers (b) made from 70 to 85 wt.-% vinylaromatic monomer (b11), in particular styrene, and 15 to 30 wt.-% methyl methacrylate (b12); more preferred are copolymers (b) made from 74 to 84 wt.-% (b11) and 16 to 26 wt.-% (b12). Most preferred are copolymers (b) made from 82 to 76 wt.-% (b11) and 18 to 24% (b12). In said compositions the total amount of (b11) and (b12) is 100 wt.-%.

Particularly preferred are random copolymers (b) of the afore-mentioned compositions.

Component (b) is obtained in a known manner by bulk, solution, suspension, precipitation or emulsion polymerization. Details of these processes are described, for example, in Kunststoffhandbuch, ed. R. Vieweg and G. Daumiller, Vol. V "Polystyrol", Carl-Hanser-Verlag Munich, 1969, p.

118 ff. SMMA copolymers (b) are known products which are commercially available from Styrolution (Frankfurt, Germany) as NAS® 21, NAS® 30, and NAS® 90.

Component (c)

The polymer composition of the invention may optionally comprise additive(s) and/or processing aid(s) (c) such as stabilizers, oxidation retarders, agents to counter thermal decomposition and decomposition due to ultraviolet light, lubricants and mold release agents.

Examples of oxidation retarders and heat stabilizers are halides of the metals from group I of the periodic table, examples being sodium, potassium and/or lithium halides, optionally in combination with copper(I) halides, e.g., chlorides, bromides, iodides, sterically hindered phenols, hydroquinones, different substituted representatives of these groups, and mixtures thereof, in concentrations of up to 1 wt.-%, based on the weight of the thermoplastic molding composition.

UV stabilizers, used generally in amounts of up to 2 wt.-%, based on the molding composition, include various substituted resorcinols, salicylates, benzotriazoles, and benzophenones.

Examples of lubricants and mold release agents, which can be used in general in amounts up to 1 wt.-%, are long-chain fatty acids such as stearic acid or behenic acid, their salts (e.g., Zn stearate) or esters (e.g., stearyl stearate or pentaerythrityl tetrastearate), and also amide derivatives (e.g., ethylenebisstearylamide).

Processing assistants which can be used are, for example, mineral oil, preferably medical white oil, in amounts up to 5 wt.-%, preferably up to 2 wt.-%.

Examples of plasticizers include mineral oil, dioctyl phthalate, dibenzyl phthalate, butyl benzyl phthalate, hydrocarbon oils, N-(n-butyl)benzenesulfonamide, and o- and p-tolylethylsulfonamide.

Preferred are polymer compositions according to the invention wherein at least one additive, in particular at least one anti-oxidant and/or thermal stabilizer, and/or a processing aid or plasticizer such as a mineral oil are present.

Process for the Preparation of the Polymer Composition

The invention also relates to a process for preparing the polymer compositions by mixing the components. Mixing processes known per se may be used to prepare the inventive polymer composition e.g. by melt mixing of components (a) and (b) and, if appropriate, by addition of component (c) to the obtained melt. For this purpose it is advantageous to use extruders, e.g. single-screw or twin-screw extruders, or other conventional plasticizers, such as Brabender mixers or Banbury mixers.

The polymer composition so formed can be molded to any desired shape as by extrusion and hot molding (e.g. injection molding).

Accordingly a further subject of the invention is a molding, fiber or foil comprising the in- ventive polymer composition. The polymer compositions show an improved toughness and clarity in comparison to SMMA/SBC blends of the prior art wherein a SBC with a tapered block architecture is used. The moldings, fibers or foils have improved properties in respect to toughness and clarity having the advantage that they can be used for many applications.

A further subject of the invention is the use of a molding, fiber or foil comprising the inventive polymer composition for various applications in household, appliance and healthcare sectors. Example applications include drinkware, vacuum cleaner parts, paper towel dispensers, pen barrels, point-of-purchase informative displays, toys, office accessories, syringe barrels, urine meters, and filter housings.

The examples below and the patent claims provide further explanation of the invention.

EXAMPLES

Test methods:

Modulus of elasticity, tensile stress at break, and tensile strain at break were determined in the tensile test to ASTM D638. The melt flow rate was determined to ASTM D1238 at 200° C. and 5 kg. The Notched Izod impact strength was determined in accordance with D256. The haze and optical properties were determined in accordance with ASTM D1003. The Vicat softening point was determined according to ASTM D1525 (10 N force and 120° C/hour rate).

Starting materials:

SMMA 1 random styrene-methylmethacrylate-copolymer with a methylmethacrylate content of 24% by weight; $M_w$ 280,000 g/mol; with 3 wt.-% (related to the total weight of the SMMA copolymer) mineral oil plasticizer (Drakeol® 34) incorporated in the SMMA copolymer.

SMMA 2 random styrene-methylmethacrylate-copolymer with a methylmethacrylate content of 21.5% by weight, $M_w$ 220,000 g/mol.

SBC 1 star shaped styrene butadiene copolymer of the structure

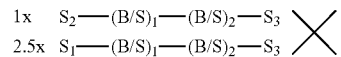

with random 50/50 butadiene/styrene copolymer blocks $(B/S)_1$ and random 67/33 butadiene/styrene copolymer blocks $(B/S)_2$ and styrene homopolymer blocks S1, S2, and S3.

Star-shaped styrene butadiene block copolymers SBC 1 were obtained by sequential anionic polymerisation of styrene and butadiene in cyclohexane as solvent at from 60 to 90° C., followed by coupling using epoxidized linseed oil (Edenol B 316 from Henkel).

The process was carried out using as initial charge of sec-butyllithium and cyclohexane titrated to the end point with sec-butyllithium in a 1500 l stirred reactor and metering in the amount of styrene (styrene I) needed to prepare the block Sa.

This was followed by another initiation using sec-butyllithium (sec-BuLi II) and metering in the appropriate amount of styrene (styrene II) for the block Sb. After all of the styrene had been consumed, potassium tert. acrylate (KTA) (Li:K=36:1) was added as randomizer and the blocks $(B/S)_1$ were attached by adding a mixture of styrene (styrene III) and butadiene I. Then the blocks $(B/S)_2$ were polymerized on by adding a mixture of styrene (styrene IV) and butadiene II. A final amount of styrene (styrene V) was added to make a short block $S_c$. The resultant living block copolymer chains were then coupled using Edenol B 316.

The amounts of the starting materials used are given in Table 1.

(The block termed $S_i$ in the description corresponds to $S_b$, $S_2$ is formed from $S_a$ and $S_b$.)

TABLE 1

Amounts of starting materials used for SBC 1

|  | Block | unit | |
|---|---|---|---|
| Cyclohexane | | l | 300 |
| Styrene I | $S_a$ | kg | 183 |
| sec-Buli I 1.35 m | | l | 2.197 |
| K-THL (3%) | | l | 0.325 |
| sec-Buli II 1.35 m | | l | 5.270 |
| Styrene II | $S_b$ | kg | 114 |
| Butadiene I | $(B/S)_1$ | kg | 38.1 |
| Styrene III | $(B/S)_1$ | kg | 37.4 |
| Butadiene II | $(B/S)_2$ | kg | 102 |
| Styrene IV | $(B/S)_2$ | kg | 49.3 |
| Styrene V | $S_c$ | kg | 14.0 |
| Edenol B316 | | l | 1.19 |

SBC 2: Styrolux® 684D obtained from INEOS Styrolution, Frankfurt/Germany; a styrene butadiene block copolymer with a tapered block architecture where the B/S block becomes progressively more rich in one monomer constituent as it progressives from one end to the other.

SBC 3: K-Resin® SBC grade KR03 obtained from Chevron Phillips Chemical Company LP, USA; a styrene butadiene block copolymer with a sharp block transition. Block copolymer SBC 1 with random blocks (B/S) was blended with copolymer SMMA 1 (see Tables 2, 3 and 4).

The materials as shown in Tables 2 and 3 were compounded using a 30 mm twin screw extruder with zone temperatures set from 180 to 190° C. Specimens were injection molded and tested for their mechanical and optical properties.

TABLE 2

| Formulation | wt.-% | wt.-% | wt.-% | wt.-% | wt.-% | wt.-% | wt.-% | wt.-% |
|---|---|---|---|---|---|---|---|---|
| SMMA 1 | 80 | 70 | 60 | 50 | 40 | 30 | 20 | 10 |
| SBC 1 | 20 | 30 | 40 | 50 | 60 | 70 | 80 | 90 |
| Total | 100 | 100 | 100 | 100 | 100 | 100 | 100 | 100 |
| Properties | | | | | | | | |
| Melt Flow Rate, g/10 min. | 2.5 | 3.1 | 3.8 | 4.5 | 3.1 | 4.5 | 6.8 | 8.2 |
| Notched Izod impact strength, ft-lb/in | 0.5 | 0.4 | 8.6 | 12.5 | 13.8 | 13.3 | 11.4 | 13.6 |
| Haze, % | 2.0 | 1.4 | 1.0 | 1.4 | 2.4 | 2.8 | 2.1 | 2.2 |

Notched Izod impact strength measurements exceeding 8.0 ft-lb/in, which is quite high, were obtained with as little as 40 wt.-% of the SBC (cp. Table 2).

TABLE 3

| Formulation | wt.-% | wt.-% | wt.-% | wt.-% | wt.-% |
|---|---|---|---|---|---|
| SMMA 1 | 69.9 | 59.9 | 49.9 | 39.9 | 29.9 |
| SBC 1 | 30 | 40 | 50 | 60 | 70 |
| Irganox 1076 | 0.1 | 0.1 | 0.1 | 0.1 | 0.1 |
| Properties | | | | | |
| Notched Izod impact strength, ft-lb/in | 0.4 | 11.7 | 12.8 | 13.6 | 11.4 |
| Melt flow rate, g/10 min | 3.4 | 4.5 | 5.0 | 5.3 | 6.4 |
| Tensile stress at yield, psi | 4300 | 3380 | 3010 | 2380 | 2380 |
| Tensile stress at break, psi | 4350 | 3580 | 3240 | 2930 | 2680 |
| Tensile strain at break, % | 32 | 47 | 73 | 104 | 136 |
| Flexural strength, psi | 8710 | 6400 | 5200 | 4160 | 3520 |
| Flexural modulus, kpsi | 351 | 268 | 229 | 192 | 166 |
| Vicat Softening Point, ° C. | 98 | 96 | 93 | 87 | 81 |
| Clarity (Illuminate CIE-C), % | 98.5 | 98.6 | 98.7 | 99.2 | 99.2 |
| Haze (Illuminate CIE-C), % | 2.2 | 2.2 | 2.6 | 2.4 | 3.0 |
| Transmittance (Illuminate CIE-C), % | 89.7 | 89.7 | 89.2 | 88.9 | 88.8 |

The materials as shown in Table 4 were compounded using a single screw 1.5 inch extruder with zone temperatures set from 218 to 232° C. Specimen were injection molded and tested for their mechanical and optical properties.

TABLE 4

| Formulation | wt.-% | wt.-% | wt.-% | wt.-% | wt.-% |
|---|---|---|---|---|---|
| SMMA 1 | 69 | 66 | 63 | 60 | 57 |
| SBC 1 | 31 | 34 | 37 | 40 | 43 |
| Total | 100 | 100 | 100 | 100 | 100 |
| Properties | | | | | |
| Notched Izod impact strength, ft-lb/in | 0.4 | 3.3 | 3.9 | 5.5 | 8.1 |
| Melt flow rate, g/10 min | 3.0 | 3.6 | 3.7 | 3.7 | 4.0 |
| Vicat Softening Point, ° C. | 97 | 97 | 97 | 95 | 95 |
| Tensile stress at yield, psi | 4104 | 3854 | 3647 | 3516 | 3368 |

TABLE 4-continued

| Formulation | wt.-% | wt.-% | wt.-% | wt.-% | wt.-% |
|---|---|---|---|---|---|
| Tensile stress at break, psi | 4281 | 3952 | 3819 | 3678 | 3567 |
| Tensile strain at break, % | 42 | 42 | 42 | 47 | 54 |
| Clarity (Illuminate CIE-C) | 98.7 | 98.2 | 98.7 | 98.6 | 97.8 |
| Haze (Illuminate CIE-C) | 2.8 | 2.8 | 2.5 | 2.5 | 2.9 |
| Transmittance (Illuminate CIE-C) | 90.3 | 89.8 | 90.0 | 90.0 | 89.2 |

A tough product with notched Izod impact strength exceeding 3 ft-lb/in was achieved with as little as 34 wt.-% SBC (cp. Table 4), which demonstrates extremely high potency.

Block copolymer SBC 1 with random blocks (B/S) was blended with copolymer SMMA 2 (see Table 5). The materials as shown in Table 5 were compounded using a single screw 1.5 inch extruder with zone temperatures set from 218 to 232° C. Specimens were injection molded and tested for their mechanical and optical properties.

TABLE 5

| Formulation | wt-.% | wt-.% | wt-.% | wt-.% | wt-.% | wt-.% |
|---|---|---|---|---|---|---|
| SMMA 2 | 69.9 | 59.9 | 49.9 | 39.9 | 29.9 | 19.9 |
| SBC 1 | 30.0 | 40.0 | 50.0 | 60.0 | 70.0 | 80.0 |
| Irganox 1076 | 0.1 | 0.1 | 0.1 | 0.1 | 0.1 | 0.1 |
| Total | 100 | 100 | 100 | 100 | 100 | 100 |
| Properties | | | | | | |
| Notched Izod impact strength, ft-lb/in | 0.5 | 0.5 | 3.0 | 11.9 | 13.3 | 13.7 |
| Melt flow rate, g/10 min | 3.8 | 4.4 | 4.8 | 5.1 | 6.0 | 6.6 |
| Vicat Softening Point, ° C. | 101 | 99 | 97 | 95 | 89 | 84 |
| Tensile stress at yield, psi | 5950 | 4633 | 3647 | 3363 | 2697 | 1916 |
| Tensile stress at break, psi | 4350 | 3981 | 3589 | 3493 | 3162 | 2881 |
| Tensile strain at break, % | 16 | 28 | 56 | 69 | 96 | 130 |
| Clarity (Illuminate CIE-C) | 98.1 | 98.1 | 98.7 | 98.8 | 98.7 | 98.6 |
| Haze (Illuminate CIE-C) | 1.5 | 2.0 | 1.5 | 1.6 | 1.7 | 2.2 |
| Transmittance (Illuminate CIE-C) | 91.1 | 90.6 | 90.3 | 90.6 | 90.2 | 90.4 |

Outstanding toughness was achieved with as low as 50 wt.-% SBC 1 (cp. Table 5).

By comparison, Tables 6 and 7 contain the results of SMMA 2 blended with an SBC with a tapered block arrangement (SBC 2).

The materials as shown in Tables 6 and 7 were compounded using a single screw 0.75 inch extruder with zone temperatures set from 160 to 200° C. Specimens were injection molded and tested for their mechanical and optical properties.

TABLE 6

| Formulation | wt.-% | wt.-% | wt.-% | wt.-% | wt.-% | wt.-% | wt.-% |
|---|---|---|---|---|---|---|---|
| SBC 2 | 60 | 55 | 50 | 45 | 40 | 38 | 36 |
| SMMA 2 | 40 | 45 | 50 | 55 | 60 | 62 | 64 |
| Total | 100 | 100 | 100 | 100 | 100 | 100 | 100 |
| Properties | | | | | | | |
| Notched Izod impact strength, ft-lb/in | 0.4 | 0.3 | 0.3 | 0.3 | 0.4 | 0.5 | 0.4 |
| Melt flow rate, g/10 min | 5.5 | 5.4 | 5.3 | 4.6 | 4.7 | 4.8 | 5.0 |
| Vicat Softening Point, ° C. | 96 | 97 | 98 | 99 | 100 | 100 | 100 |
| Tensile stress at yield, psi | 4222 | 4507 | 4827 | 5268 | 5312 | 5318 | 5166 |
| Tensile stress at break, psi | 3624 | 3764 | 4032 | 4326 | 4252 | 4258 | 4128 |
| Tensile strain at break, % | 45 | 45 | 36 | 34 | 29 | 13 | 16 |
| Haze (Illuminate CIE-C), % | 2.5 | 2.7 | 2.6 | 2.4 | 1.8 | 1.6 | 1.7 |

TABLE 7(a)

| Formulation | wt.-% | wt.-% | wt.-% | wt.-% | wt.-% | wt.-% | wt.-% | wt.-% | wt.-% | wt.-% | wt.-% |
|---|---|---|---|---|---|---|---|---|---|---|---|
| SBC 2 | 0 | 10 | 20 | 30 | 40 | 50 | 60 | 70 | 80 | 90 | 100 |
| SMMA 2 | 100 | 90 | 80 | 70 | 60 | 50 | 40 | 30 | 20 | 10 | 0 |
| Total | 100 | 100 | 100 | 100 | 100 | 100 | 100 | 100 | 100 | 100 | 100 |
| Properties |  |  |  |  |  |  |  |  |  |  |  |
| Melt flow rate, g/10 min | 2.8 | 2.6 | 2.7 | 3.4 | 4.2 | 5.2 | 5.2 | 6.3 | 7.5 | 8.4 | 10.1 |
| Notched Izod impact strength, ft-lb/in | 0.4 | 0.4 | 0.3 | 0.4 | 0.4 | 0.4 | 0.2 | 0.5 | 0.7 | 0.6 | 0.6 |
| Haze (Illuminate CIE-C), % | 0.5 | 0.8 | 1.1 | 1.3 | 1.6 | 2.1 | 2.5 | 3.1 | 3.3 | 3.5 | 2.8 |

TABLE 7(b)

Mineral oil (Drakeol 34) is incorporated into SMMA 2 to improve ductility.

| Formulation | wt.-% | wt.-% | wt.-% | wt.-% | wt.-% | wt.-% | wt.-% | wt.-% | wt.-% | wt.-% | wt.-% |
|---|---|---|---|---|---|---|---|---|---|---|---|
| SBC 2 | 0 | 10 | 20 | 30 | 40 | 50 | 60 | 70 | 80 | 90 | 100 |
| SMMA 2 + 3 wt.-% Mineral Oil | 100 | 90 | 80 | 70 | 60 | 50 | 40 | 30 | 20 | 10 | 0 |
| Total | 100 | 100 | 100 | 100 | 100 | 100 | 100 | 100 | 100 | 100 | 100 |
| Properties |  |  |  |  |  |  |  |  |  |  |  |
| Melt flow rate, g/10 min | 3.5 | 4.2 | 4.5 | 5.2 | 5.8 | 6.2 | 6.8 | 7.5 | 8.6 | 8.8 | 10.1 |
| Notched Izod impact strength, ft-lb/in | 0.4 | 0.4 | 0.4 | 0.5 | 0.5 | 0.3 | 0.6 | 4.4 | 2.5 | 0.8 | 0.6 |
| Haze (Illuminate CIE-C), % | 0.5 | 1.3 | 2.4 | 2.9 | 3.3 | 3.7 | 4.0 | 3.9 | 3.8 | 3.8 | 2.8 |

The amount of the mineral oil relates to the total weight of the SMMA copolymer.

Aside from a narrow range around 70% SBC (Table 7(b)) the toughness of such blends is low. In all cases, the toughness is below that of the blends according to Tables 2 to 5 comprising SBCs with randomly arranged blocks.

Also by comparison, Tables 8 and 9 contain results for SBC 2 with tapered block architecture blended with SMMA 1. The materials as shown in Table 8 were compounded using a single screw 0.75 inch extruder with zone temperatures set from 160 to 200° C. Specimens were injection molded and tested for their mechanical and optical properties.

TABLE 8

| Formulation | wt.-% | wt.-% | wt.-% | wt.-% | wt.-% | wt.-% | wt.-% | wt.-% | wt.-% | wt.-% | wt.-% |
|---|---|---|---|---|---|---|---|---|---|---|---|
| SBC 2 | 0 | 10 | 20 | 30 | 40 | 50 | 60 | 70 | 80 | 90 | 100 |
| SMMA 1 | 100 | 90 | 80 | 70 | 60 | 50 | 40 | 30 | 20 | 10 | 0 |
| Total | 100 | 100 | 100 | 100 | 100 | 100 | 100 | 100 | 100 | 100 | 100 |
| Properties |  |  |  |  |  |  |  |  |  |  |  |
| Melt flow rate, g/10 min | 1.5 | 1.8 | 2.2 | 3.2 | 3.7 | 4.5 | 5.3 | 6.5 | 7.4 | 11.0 | 10.1 |
| Notched Izod impact strength, ft-lb/in | 0.7 | 0.6 | 0.4 | 0.4 | 0.5 | 0.6 | 11.9 | 12.2 | 12.6 | 0.9 | 0.6 |
| Haze (Illuminate CIE-C), % | 0.7 | 1.8 | 2.2 | 2.6 | 2.8 | 3.1 | 2.7 | 3.0 | 3.6 | 6.9 | 2.8 |

The materials as shown in Table 9 were compounded using a 30 mm twin screw extruder with zone temperatures set from 180 to 190° C. Specimens were injection molded and tested for their mechanical and optical properties.

TABLE 9

| Formulation | wt.-% | wt.-% | wt.-% | wt.-% | wt.-% | wt.-% |
|---|---|---|---|---|---|---|
| SMMA 1 | 54.9 | 49.9 | 44.9 | 39.9 | 34.9 | 29.9 |
| SBC 2 | 45.0 | 50.0 | 55.0 | 60.0 | 65.0 | 70.0 |
| Irganox 1076 | 0.1 | 0.1 | 0.1 | 0.1 | 0.1 | 0.1 |
| Total | 100 | 100 | 100 | 100 | 100 | 100 |
| Properties | | | | | | |
| Notched Izod impact strength, ft-lb/in | 0.5 | 2.0 | 2.5 | 11.7 | 11.3 | 11.5 |
| Melt flow rate, g/10 min | 4.6 | 5.0 | 5.1 | 5.8 | 5.9 | 7.1 |
| Tensile stress at yield, psi | 3550 | 3370 | 3180 | 2990 | 2700 | 2670 |
| Tensile stress at break, psi | 3590 | 3490 | 3380 | 3260 | 3110 | 3020 |
| Tensile strain at break, % | 58 | 72 | 83 | 85 | 98 | 103 |
| Clarity (Illuminate CIE-C), % | 99.3 | 99.3 | 98.8 | 99.3 | 99.3 | 99.4 |
| Haze (Illuminate CIE-C), % | 2.0 | 1.8 | 1.8 | 2.1 | 2.5 | 2.6 |
| Transmittance (Illuminate CIE-C), % | 89.9 | 89.5 | 89.5 | 89.9 | 88.5 | 88.5 |

The range of high toughness is again narrower and begins at a significantly higher SBC content (see Tables 8 and 9) demonstrating a lack of potency vs. SBC 1 (cp. Tables 2 to 5).

Tables 10 and 11 illustrate comparative data obtained by blending an SBC with a sharp block transition (SBC 3) with SMMA 2. The materials as shown in Table 10 were compounded using a single screw 0.75 inch extruder with zone temperatures set from 160 to 200° C.

Specimens were injection molded and tested for their mechanical and optical properties.

TABLE 10

| Formulation | wt.-% | wt.-% | wt.-% | wt.-% | wt.-% | wt.-% | wt.-% | wt.-% | wt.-% | wt.-% | wt.-% |
|---|---|---|---|---|---|---|---|---|---|---|---|
| SBC 3 | 0 | 10 | 20 | 30 | 40 | 50 | 60 | 70 | 80 | 90 | 100 |
| SMMA 2 + 3 wt.-% Mineral Oil | 100 | 90 | 80 | 70 | 60 | 50 | 40 | 30 | 20 | 10 | 0 |
| Total | 100 | 100 | 100 | 100 | 100 | 100 | 100 | 100 | 100 | 100 | 100 |
| Properties | | | | | | | | | | | |
| Melt flow rate, g/10 min | 3.5 | 4.0 | 4.1 | 4.9 | 5.0 | 4.9 | 5.3 | 5.6 | 5.8 | 6.4 | 7.0 |
| Notched Izod impact strength, ft-lb/in | 0.4 | 0.4 | 0.4 | 0.4 | 0.4 | 0.5 | 0.6 | 1.0 | 0.8 | 0.5 | 5.8 |
| Haze (Illuminate CIE-C), % | 0.5 | 0.9 | 1.7 | 2.2 | 2.3 | 2.4 | 2.3 | 2.1 | 2.0 | 1.6 | 1.5 |

The materials as shown in Table 11 were compounded using a single screw 1.5 inch extruder with zone temperatures set from 218 to 232° C. Specimens were injection molded and tested for their mechanical and optical properties.

TABLE 11

| Formulation | wt.-% | wt.-% | wt.-% |
|---|---|---|---|
| SMMA 2 | 39.9 | 29.9 | 19.9 |
| SBC 3 | 60.0 | 70.0 | 80.0 |
| Irganox 1076 | 0.1 | 0.1 | 0.1 |
| Total | 100 | 100 | 100 |
| Properties | | | |
| Notched Izod impact strength, ft-lb/in | 0.5 | 0.5 | 0.5 |
| Melt flow rate, g/10 min | 4.4 | 4.7 | 5.4 |
| Vicat Softening Point, ° C. | 98 | 96 | 94 |
| Tensile stress at yield, psi | 3945 | 3444 | 3351 |
| Tensile stress at break, psi | 3489 | 3176 | 2963 |
| Tensile strain at break, % | 54 | 81 | 94 |
| Clarity (Illuminate CIE-C) | 99.5 | 98.8 | 99.3 |
| Haze (Illuminate CIE-C) | 1.1 | 1.5 | 0.9 |
| Transmittance (Illuminate CIE-C) | 91.1 | 90.9 | 91.1 |

Tables 10 and 11 illustrate the comparative lack of toughness obtained by blending an SBC with a sharp block transition (SBC 3) with SMMA 2.

The invention claimed is:

1. A polymer composition comprising components (a), (b), and (c):
   (a) 33 to 52 wt.-% of at least one star-shaped block copolymer (a) which comprises at least two terminal polymer blocks $S_1$ and S2 made from vinylaromatic monomers and at least one random copolymer block (B/S) made from 20 to 60 wt.-% vinylaromatic monomer, and from 40 to 80 wt.-% diene, and where the total block copolymer (a) is made from 50 to 85 wt.-% vinylaromatic monomer and from 15 to 50 wt.-% diene;
   (b) 48 to 67 wt.-% of at least one copolymer (b) made from 65 to 90 wt.-% vinylaromatic monomer (b11) and 10 to 35 wt.-% methyl methacrylate (b12); and optionally
   (c) 0 to 5 wt.-% of one or more additive(s) and/or processing aid (c),
   wherein
   the total amount of components (a), (b), and (c) is 100 wt.-%;
   the star-shaped block copolymer (a) has structures in which the star has at least one branch having the block sequence $S_1$-(B/S)$_1$-(B/S)$_2$ and at least one branch having the block sequence $S_2$-(B/S)$_1$-(B/S)$_2$, or in which the star has at least one branch with the block sequence $S_1$-(B/S)$_1$-(B/S)$_2$-$S_3$ and at least one branch with the block sequence $S_2$-(B/S)$_1$-(B/S)$_2$-$S_3$, wherein:
   $M_n$ of $S_1$ is from 5,000 to 30,000 g/mol;
   $M_n$ of $S_2$ is from 35,000 g/mol to 150,000 g/mol; and
   $S_3$ is a further polymer block made from vinylaromatic monomers with $M_n$ being smaller than 2,500 g/mol; and
   the random copolymer block (B/S)$_1$ is made from 40 to 60 wt.-% vinylaromatic monomer and from 40 to 60 wt.-% diene, and the random copolymer block (B/S)$_2$ is made from 20 to 39 wt.-% vinylaromatic monomer and from 61 to 80 wt.-% diene.

2. The polymer composition according to claim 1 comprising components (a), (b), and (c) in the following amounts:
   33 to 50 wt.-% (a),
   50 to 67 wt.-% (b), and
   0 to 5 wt.-% (c).

3. The polymer composition according to claim 1 comprising components (a), (b), and (c) in the following amounts:
   34 to 45 wt.-% (a),
   55 to 66 wt.-% (b), and
   0 to 4 wt.-% (c).

4. The polymer composition according to claim 1, wherein the values of the refractive index of components (a) and (b) differ no more than 0.005.

5. The polymer composition according to claim 1, wherein the copolymers (b) are made from 70 to 85 wt.-% (b11), and 15 to 30 wt.-% (b12).

6. The polymer composition according to claim 1, wherein the copolymers (b) are made from 74 to 84 wt.-% (b11) and 16 to 26 wt.-% (b12).

7. A process for the preparation of the polymer composition according to claim 1, prepared by mixing the components (a), (b), and (c).

8. A molding, a fiber, or a foil, comprising the polymer composition according to claim 1.

9. A method of using a molding, a fiber, or a foil, comprising the polymer composition according to claim 1 in the household, appliance, and healthcare sector.

10. The polymer composition according to claim 1, wherein the star-shaped block copolymer (a) is of the following structures:

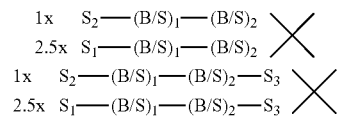

where X is a tetrafunctional coupling agent.

11. The polymer composition according to claim 1 comprising components (a), (b), and (c):
    (a) 33 to 52 wt.-% of at least one star-shaped block copolymer (a) which comprises at least two terminal polymer blocks $S_1$ and $S_2$ made from styrene and at least one random copolymer block (B/S) made from 20 to 60 wt.-% styrene and from 40 to 80 wt.-% 1,3-butadiene, and where the total block copolymer (a) is made from 50 to 85 wt.-% styrene and from 15 to 50 wt.-% 1,3-butadiene;
    (b) 48 to 67 wt.-% of at least one copolymer (b) made from 65 to 90 wt.-% styrene (b11) and 10 to 35 wt.-% methyl methacrylate (b12); and
    (c) 0 to 5 wt.-% of one or more additive(s) and/or processing aid (c),
    wherein
    the total amount of components (a), (b), and (c) is 100 wt.-%;
    the star-shaped block copolymer (a) has structures in which the star has at least one branch having the block sequence $S_1$-(B/S)$_1$-(B/S)$_2$ and at least one branch having the block sequence $S_2$-(B/S)$_1$-(B/S)$_2$, or in which the star has at least one branch with the block sequence $S_1$-(B/S)$_1$-(B/S)$_2$-$S_3$ and at least one branch with the block sequence $S_2$-(B/S)$_1$-(B/S)$_2$-$S_3$, wherein:
    $M_n$ of $S_1$ is from 5,000 to 30,000 g/mol;
    $M_n$ of S2 is from 35,000 g/mol to 150,000 g/mol; and
    $S_3$ is a further polymer block made from vinylaromatic monomers with $M_n$ being smaller than 2,500 g/mol; and
    the random copolymer block (B/S)$_1$ is made from 40 to 60 wt.-% styrene and from 40 to 60 wt.-% 1,3-butadiene, and the random copolymer block (B/S)$_2$ is made from 20 to 39 wt.-% styrene and from 61 to 80 wt.-% 1,3-butadiene.

* * * * *